United States Patent [19]
Momose

[11] Patent Number: 4,776,454
[45] Date of Patent: Oct. 11, 1988

[54] CONVEYOR BELT

[76] Inventor: Terunobu Momose, 56, Miyamae-cho 1-chome, Mizunami-shi, Gifu-ken, Japan

[21] Appl. No.: 89,049

[22] Filed: Aug. 24, 1987

Related U.S. Application Data

[62] Division of Ser. No. 879,313, Jun. 27, 1986, abandoned.

[30] Foreign Application Priority Data

Jun. 29, 1985 [JP] Japan .................................. 60-143021

[51] Int. Cl.⁴ ............................................. B65G 17/06
[52] U.S. Cl. ...................................... 198/853; 198/850
[58] Field of Search ................ 198/850, 851, 853, 730

[56] References Cited

U.S. PATENT DOCUMENTS

| | | | |
|---|---|---|---|
| 2,766,635 | 10/1956 | Schwarzkopf | 198/850 |
| 3,262,549 | 7/1966 | Stewart et al. | 198/850 X |
| 3,672,488 | 6/1972 | Collins | 198/853 |
| 3,680,927 | 8/1972 | Neureuther | 198/850 X |
| 3,915,025 | 10/1975 | Poerink | 198/850 X |
| 3,921,796 | 11/1975 | Bok et al. | 198/853 |
| 4,170,281 | 10/1979 | Lapeyre | 198/850 X |
| 4,276,980 | 7/1981 | Oizumi | 198/853 |
| 4,438,838 | 3/1984 | Hodlewsky et al. | 198/853 |
| 4,473,365 | 9/1984 | Lapeyre | 198/853 |
| 4,537,658 | 8/1985 | Albert | 198/850 X |
| 4,582,972 | 4/1986 | Curtin et al. | 198/851 X |
| 4,641,740 | 2/1987 | Grecksch et al. | 198/853 |

FOREIGN PATENT DOCUMENTS

| | | | |
|---|---|---|---|
| 1192520 | 10/1959 | France | 198/853 |
| 2567493 | 1/1986 | France | 198/853 |
| 337624 | 6/1921 | Fed. Rep. of Germany | 198/853 |
| 2020106 | 11/1971 | Fed. Rep. of Germany | 198/853 |

*Primary Examiner*—Randolph A. Reese
*Assistant Examiner*—Anthony Knight
*Attorney, Agent, or Firm*—Cushman, Darby & Cushman

[57] ABSTRACT

A conveyer belt having a large number of links each being made of ceramics. The links are endlessly connected to one another in a front portion and a rear portion of each of the large number of links in the running direction of the conveyer belt. One of the links is provided with a fittable groove of an arc-shaped section in a portion opposed to an adjacent link. The fittable groove has an opening opposed to the adjacent link. The width of the opening is smaller than the diameter of the fittable groove. The adjacent link is provided with a columnar fittable axis portion along a surface opposed to the one link. The fittable axis portion is fit in the fittable groove of the one link so that one link and the adjacent link are turnably connected to each other.

4 Claims, 8 Drawing Sheets

CONVEYOR BELT

This is a division of application Ser. No. 879,313, filed June 27, 1986, which was abandoned upon the filing hereof.

BACKGROUND OF THE INVENTION

1. Field of the Invention

The present invention relates to a conveyer belt.

2. Description of the Prior Art

The conveyer belt is generally formed endless and is extended around at least two driving wheels. By turning the driving wheels, the conveyer belt is endlessly run.

Therefore, the conveyer belt must be flexible and deformable at least while running in contact with the driving wheels. To this end, conventionally, leather or cloth has been used in many cases. In addition, the conveyer belt formed by endlessly connecting steel bands or steel links, has been also used.

However, the conveyer belt formed of leather or cloth is apt to wear out, and is weak against chemicals. In addition, undesirable elongation occurs in leather or cloth due to long period use thereof and cracks also occur due to fatigue thereof. Especially, the conveyer belt formed of leather or cloth is weak against heat. This results in that such a conveyer belt cannot be used for conveying high temperature goods and also cannot be used within a tunnel kiln in the pottery industry.

The conveyer belt composed of the steel bands or the steel links is superior to that formed of leather or cloth in heat resistance, but is insufficient in chemicals resistance and rust resistance.

Furthermore, in order to form the conveyer belt of steel links, they must be connected to one another by a connecting shaft. This results in the connecting work becoming troublesome. And if the lubrication to the connecting shaft is insufficient, the steel links wear out at the early stage and accordingly, the conveyer belt is elongated so that noise grows louder while the conveyer belt is driven.

SUMMARY OF THE INVENTION

One object of the present invention is to provide a flexible conveyer belt having wear resistance, chemicals resistance, heat resistance, rust resistance, unexpansibility and uncompressibility.

Another object of the present invention is to provide a conveyer belt formed by connecting links easily without using any connecting shaft.

The conveyer belt of the present invention comprises a large number of links each being made of ceramics, which are endlessly connected to one another in a front portion and a rear portion of each of the large number of links in the running direction of the conveyer belt.

One of the links is provided with a fittable groove of an arc-shaped section in a portion opposed to an adjacent link. The fittable groove has an opening opposed to the adjacent link. The width of the opening is smaller than the diameter of the fittable groove.

The adjacent link is provided with a columnar fittable axis portion along a surface opposed to the one link. The fittable axis portion is fit in the fittable groove of the one link so that the one link and the adjacent link are turnably connected to each other.

The conveyer belt of the present invention does not require any connecting shaft and is formed by endlessly connecting an arbitrary number of links in the longitudinal direction.

And adjacent links can be easily connected to each other by inserting a fittable axis portion of one link into a fittable groove from the end thereof.

In addition, links can be also connected in the width direction by inserting the fittable axis portions of two links into the fittable groove of one link from both ends thereof. Thus, links of the same kind can compose a conveyer belt of a arbitrary width.

Furthermore, each link is made of ceramics, so the obtained belt is excellent in wear resistance, chemicals resistance, heat resistance, and rust resistance and is low in expansibility and compressibility.

BRIEF DESCRIPTION OF THE DRAWINGS

FIG. 1 is a perspective view of links composing the conveyer belt;

FIG. 2 is a view illustrating the state where a plurality of links are connected to each other;

FIG. 3 is a perspective view of the conveyer belt;

FIG. 4 is a perspective view of links composing the conveyer belt;

FIG. 5 is a view illustrating the state where a plurality of links are connected to each other;

FIG. 7 is a view illustrating the link composing the conveyer belt;

FIG. 8 is a view illustrating the state where links are connected to one another;

FIG. 9 is a sectional view taken along the line IX—IX of FIG. 8;

FIG. 10 is a view illustrating the link composing the conveyer belt;

FIG. 11 is a view illustrating the state where a plurality of links are connected to one another;

FIG. 12 is a view illustrating the link composing the conveyer belt;

FIG. 13 is a view illustrating the state where a plurality of links are connected to one another;

FIG. 14 is a perspective view of the conveyer belt;

FIG. 15 is a view illustrating the links composing the conveyer belt;

FIG. 16 is a view of the conveyer belt; and

DETAILED DESCRIPTION OF THE EMBODIMENTS

Figure 1:
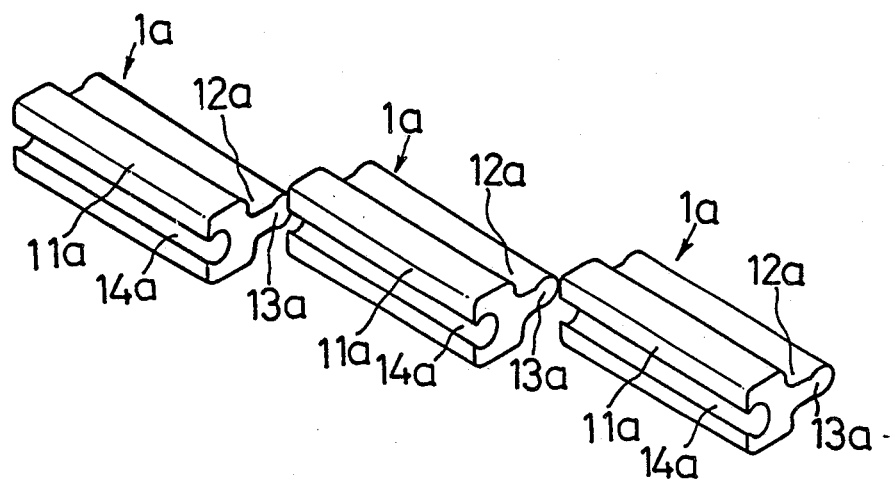
FIGS. 1 through 3 illustrate a first embodiment of the conveyer belt according to the present invention.
Figure 2:
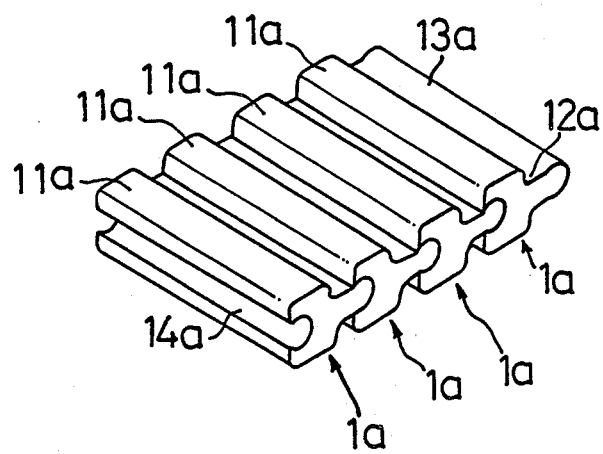
Figure 3:
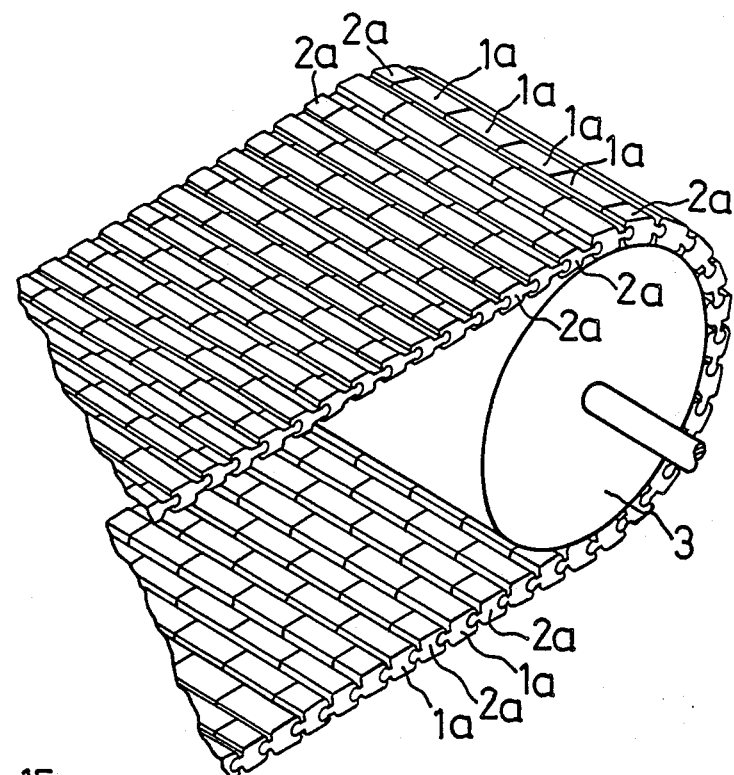

FIGS. 1 through 3 illustrate a first embodiment of the conveyer belt according to the present invention.

Each of ceramic links 1a composing the conveyer belt has the same size and shape as each other and is formed of a ceramic sintered body containing alumina as a main constituent.

A sheet-shaped supporting portion 12a extends along a front portion (right side in the drawings) of a rectangular prism-shaped main body 11a and a columnar fittable axis portion 13a of a diameter larger than the thickness of the sheet-shaped supporting portion 12a, is formed in the front surface thereof in parallel with the main body 11a.

A fittable groove 14a of an arc-shaped section is formed in a rear portion (left side in the drawings) of the main body 11a so as to open outwards in parallel with the fittable axis portion 13a.

The fittable groove 14a has such a diameter that the fittable axis portion 13a can be inserted thereinto, and such an opening width that the supporting portion 12a can be inserted thereinto.

A predetermined number of links 1a each having the above described structure are endlessly connected by inserting the fittable axis portion 13a of one link 1a into the fittable groove 14a of another link 1a adjacent to one link 1a from one end thereof.

Thus, the conveyer belt is formed.

The fittable axis portion 13a is turnable within the fittable groove 14a and the links are slidable on one another.

FIG. 3 illustrates a conveyer belt of a checkered pattern, wherein to the fittable groove 14a of one link 1a are inserted each of the fittable axis portions 13a of different two links 1a from each end thereof to arrange a plurality of links 1a in the transverse direction of the conveyer belt. In this conveyer belt, links 2a of a length half of that of the link 1a are connected to both ends of every other line of the transversely connected links 1a.

As described above, in the conveyer belt according to the present invention, links can be easily connected to one another in the transverse direction and the longitudinal direction of the conveyer belt endlessly without using any connecting shaft.

In the drawing, a reference numeral 3 denotes a driving wheel for the conveyer belt.

Figure 4:
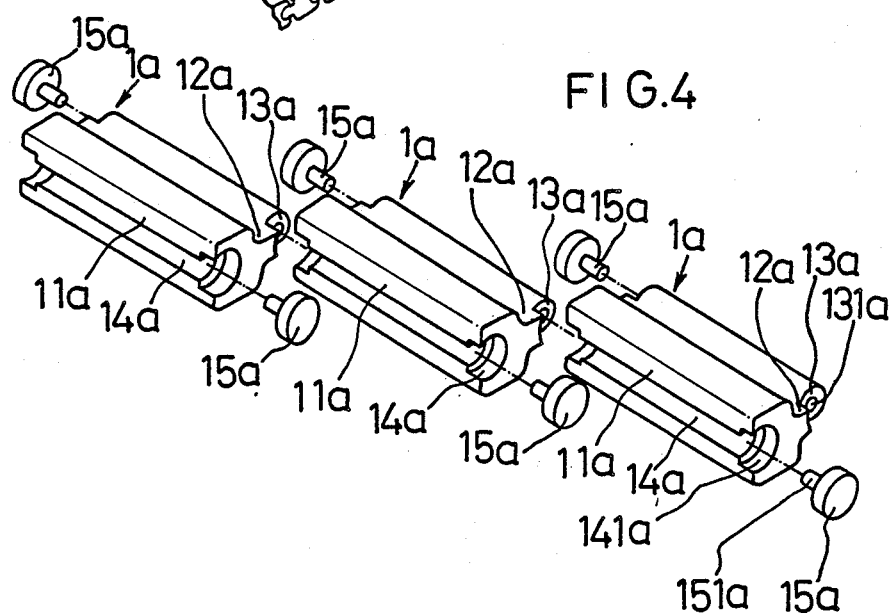
FIGS. 4 and 5 illustrate a second embodiment of the conveyer belt according to the present invention.
Figure 5:
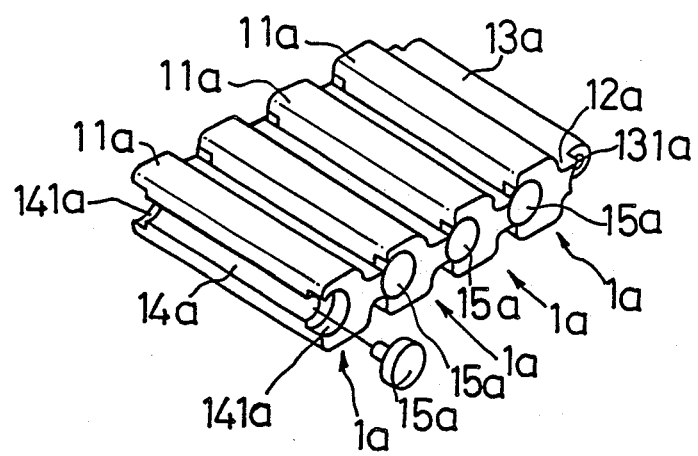

FIGS. 4 and 5 illustrate a second embodiment of the conveyer belt according to the present invention, wherein pins are provided on both side ends of the conveyer belt according to the first embodiment for preventing the slippage of adjacent links.

When the conveyer belt is driven at a high speed and when the conveyer belt vibrates on a large scale, slippage between adjacent links is apt to occur.

In FIG. 4, the both ends of the fittable axis portion 13a are cut by the thickness corresponding to the thickness of a lead portion of the pin 15a. And a hole 131a to which a foot portion 151a of the pin 15a is to be inserted, is formed in the cut end surfaces of the fittable axis portion 13a.

In open ends of the fittable groove 14a are formed larger diameter portions 141a to each of which the head portion of the pin 15a is to be closely inserted.

As shown in FIG. 5, the fittable axis portion 13a of one link is closely inserted into the fittable groove 14a of another link adjacent to the one link to compose a belt.

Thereafter, the foot portion 151a of the pin 15a, which is coated with an adhesive, is inserted into each of the holes 131a of the fittable axis portion 13a.

Figure 6:
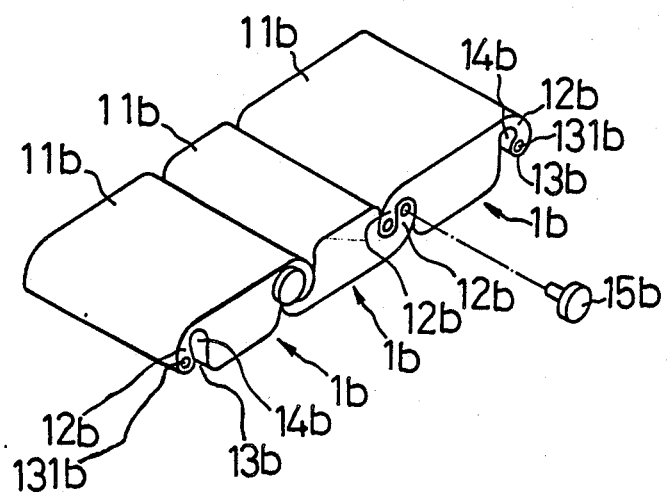
FIG. 6 illustrates a third embodiment of the conveyer belt according to the present invention of which a plurality of links are connected to one another.

FIG. 6 illustrates a third embodiment of the conveyer belt according to the present invention.

A link 1b is made of the same material as that of the first embodiment.

From the upper side of the front surface of the main body 11b of a rectangular prism-shape is extended a supporting portion 12b of a curved section like a fishhook, respectively. In a tip end portion of the supporting portion 12b is formed a fittable axis portion 13b. And the front surface of the main body 11b, the supporting portion 12b and the fittable axis portion 13b define a fittable groove 14b to which the fittable axis portion of another adjacent link is to be inserted. The fittable groove 14b opens outward in the opening portion through which the supporting portion 12b of another adjacent link inserted thereinto.

The links 1b, each having the above described structure, are connected by alternately reversing the links 1b and inserting the fittable axis portion 13b of one link 1b to the fittable groove 14b of another adjcent link 1b from the end thereof. And, if necessary, a pin 15b is inserted into each of holes 131b formed in the fittable axis portion 13b.

Figure 7:
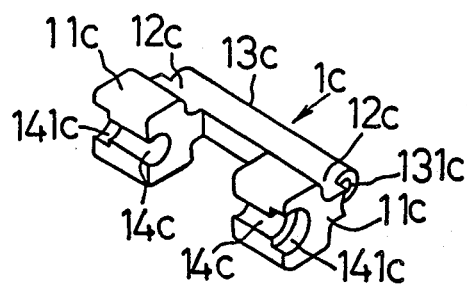
FIGS. 7 through 9 illustrate a fourth embodiment of the conveyer belt according to the present invention.
Figure 8:
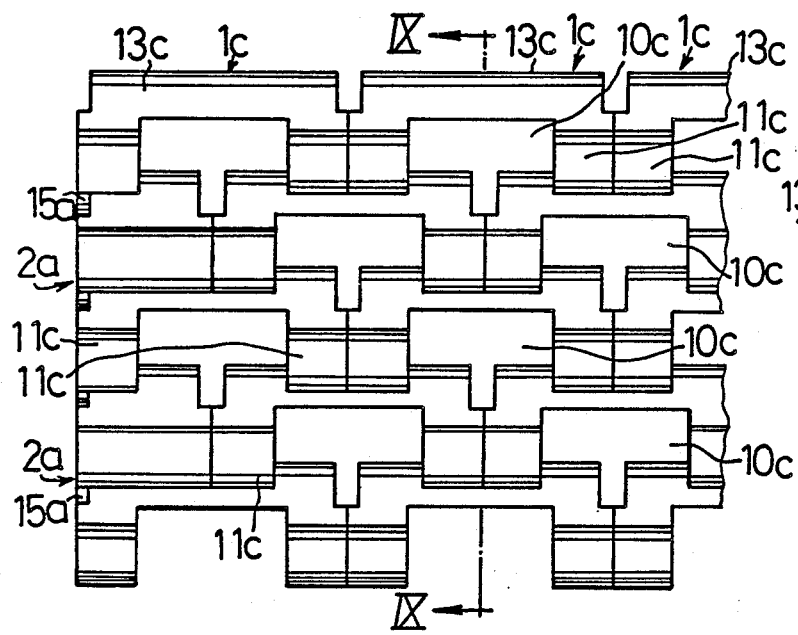
Figure 9:
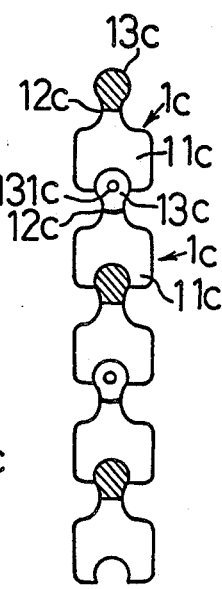

FIGS. 7 through 9 illustrate a fourth embodiment of the conveyer belt according to the present invention.

Each link 1c is made of the same material as that used in the first embodiment and is provided with two rectangular prism-shaped main bodies 11c which are integrally connected to both ends of a fittable axis portion 13c through supporting portions 12c.

The fittable axis portion 13c is provided with a hole 131c while the fittable groove portions 14c are provided with larger diameter portions 141c, respectively.

FIGS. 8 and 9 illustrate the conveyer belt composed of the connected links 1c. The reference numeral 2a designates a link of a width of half the width of the link 1c and the reference numeral 15a designates a pin. In this conveyer belt, an opening 10c is formed between adjacent links. This opening 10c serves to remove extraneous matter away from the conveyer belt and to heat conveyed goods from the underside of the conveyer belt. And this opening 10c is profitably used when the conveyed goods are allowed to cool.

Figure 10:
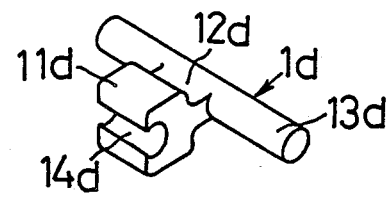
FIGS. 10 and 11 illustrate a fifth embodiment of the conveyer belt according to the present invention.
Figure 11:
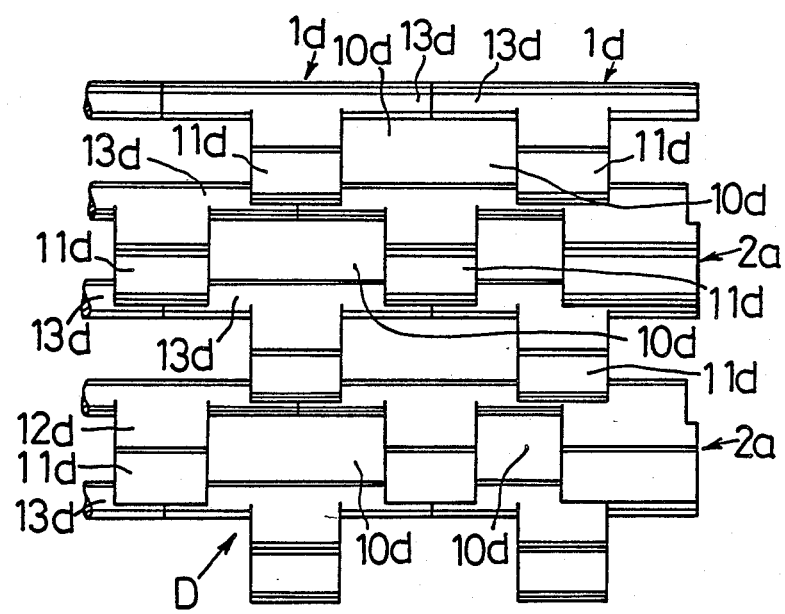

FIGS. 10 and 11 illustrate a fifth embodiment of the conveyer belt according to the present invention.

As shown in FIG. 10, a link 1d is composed of a rectangular prism-shaped main body 11d and a columnar fittable axis portion 13d of a length of about three times as large as that of the main body 11d, which is integrally connected to a front surface of the main body 11d through a supporting portion 12d in parallel therewith. The main body 11d has a fittable groove 14d.

The links 1d are connected to one another as shown in FIG. 11 to compose a conveyer belt having a large number of openings 10d.

Figure 12:
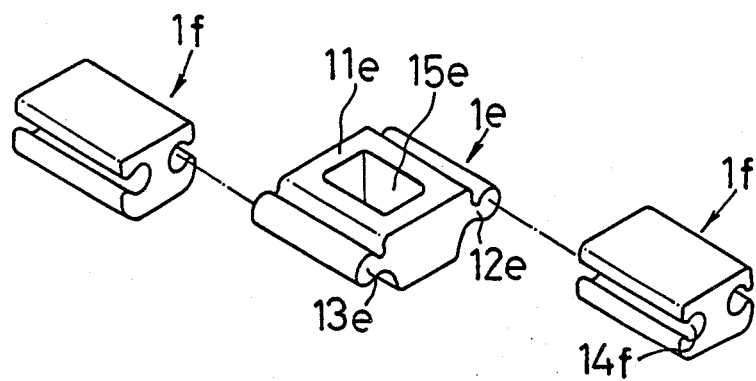
FIGS. 12 through 14 illustrate a sixth embodiment of the conveyer belt according to the present invention.
Figure 13:
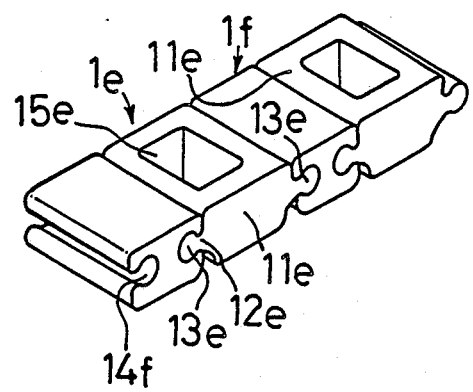

FIGS. 12 and 13 illustrate a sixth embodiemnt of the conveyer belt according to the present invention. The conveyer belt of the sixth embodiemt is composed of two kinds of links 1e and 1f each being formed of a ceramic sintered body.

As shown in FIG. 12, a link 1e of a first kind has a rectangular prism-shaped main body 11e, sheet-shaped supporting portions 12e extending from opposed front and rear surfaces of the main body 11e, and parallel fittable axis portions 13e, each being integrally formed with the sheet-shaped supporting portions 12e. The main body 11e is provided with a through hole 15e extending in the direction of thickness thereof.

And a link 1f of a second kind has a rectangular prism-shape and is provided with parallel fittable grooves 14f in opposed front and rear surfaces. Each of the parallel fittable grooves 14f has such a diameter that the fittable axis portion 13e of the link 1e can be inserted thereinto.

The fittable groove 14f has an opening along each side surface of the link 1f, into which the supporting portion 12e can be inserted.

The length of the first kind of link 1e in the traverse direction of the conveyer belt is equal to that of the second kind of link 1f.

FIG. 13 illustrates the state where the links 1e, 1f are connected to one another in the longitudinal direction of the conveyer belt. By inserting the fittable axis portions 13e of each link 1e into the fittable groove portions 14f of each link 1f from both ends thereof, the links 1e, 1f are endlessly connected in the longitudinal direction of the conveyer belt.

Figure 14:
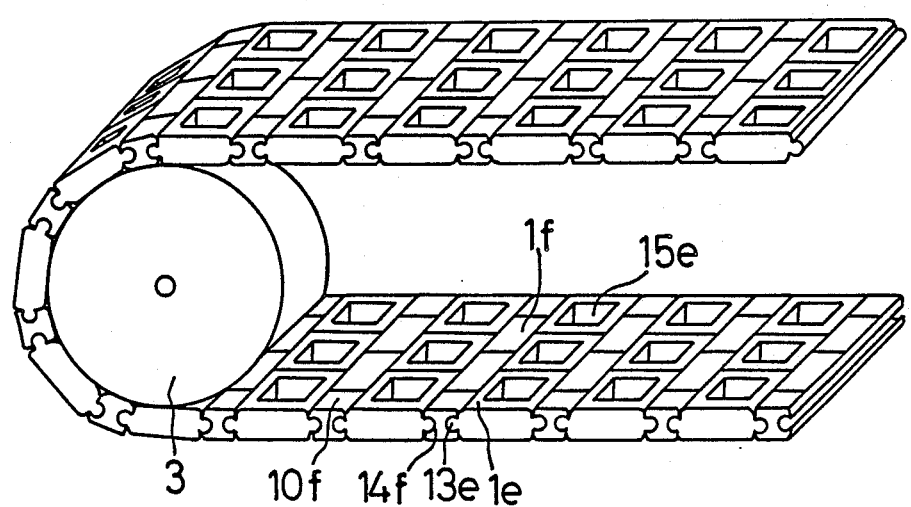

FIG. 14 illustrates a conveyer belt obtained by connecting the links 1e and 1f.

Into each of the fittable grooves 14f of one link 1f is inserted each of the fittable axis portions 13e of two links 1e, each being adjacent to the link 1f in the longitudinal direction, by half of the length of the fittable axis portions 13e.

In the above described manner, three links 1e are arranged in the transverse direction while two links 1f are arranged in such direction so as to be deviated from the links 1e by half of the length of the opposed link 1f.

And each of links 10f, each having a length of half of that of each of the links 1f, is connected to each end of the connected links 1f so as to equalize the length of the obtained conveyer belt in the transverse direction.

In FIG. 14, the reference numeral 3 designates a driving wheel.

The conveyer belt of the sixth embodiment is made of ceramics and accordingly, the wear resistance, chemicals resistance and heat resistance thereof is excellent. In addition, the conveyer belt of the sixth embodiment does not rust and does not expand nor contract due to heat.

Furthermore, according to the sixth embodiment, the links 1e and 1f can be connected to one another without using any connecting shaft, and accordingly, the conveyer belt can be easily composed.

In addition, the links 1e and 1f can freely slide on each other in the direction of thickness. This results in that the conveyer belt easily curves along the surface of the driving wheel 3.

And since the belt is provided with a plurality of through holes 15e, extraneous matter attached to the conveyer belt or the conveyed goods can be easily removed and the conveyed goods can be heated from the underside of the conveyer belt easily. And this conveyer belt conveniently serves to allow heated conveyed goods to cool.

Figure 15:
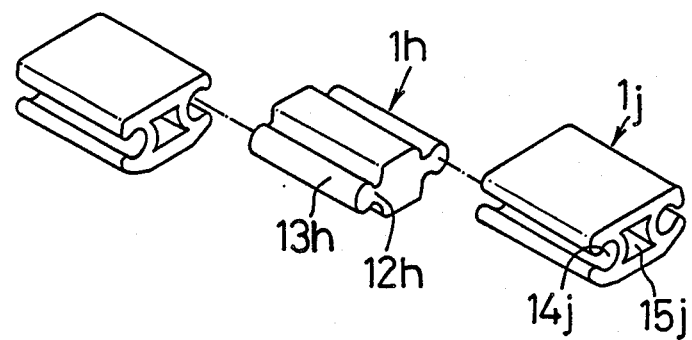
FIGS. 15 and 16 illustrate a seventh embodiment of the conveyer belt according to the present invention.
Figure 16:
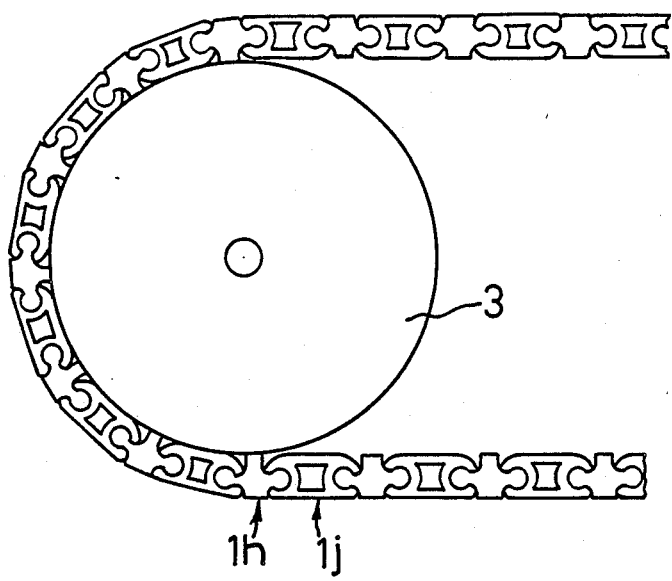

FIGS. 15 and 16 illustrate a seventh embodiment of the conveyer bet according to the present invention. The conveyer belt of the seventh embodiment is composed of a first kind of links 1h each having supporting portions 12h and fittable axis portions 13h in both side portions thereof, and a second kind of links 1j each having fittable grooves 14j in both side portions thereof and a through hole 15j extending through the central portion thereof in the transverse direction.

Figure 17:
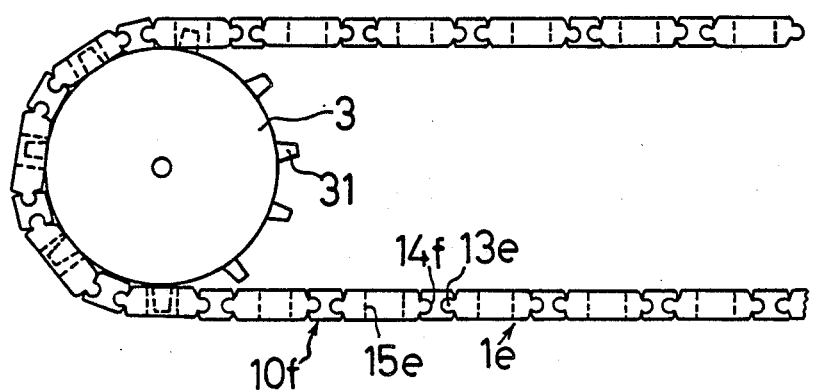
FIG. 17 is a view illustrating an eighth embodiment of the conveyer belt according to the present invention.

FIG. 17 illustrates an eighth embodiment of the conveyer belt according to the present invention.

The conveyer belt has a structure substantially equal to that of the sixth embodiment shown in FIG. 14.

According to the eighth embodiment, projections 31 which are enageable with the through holes 15e of the link 1e, are formed in the outer peripheral surface of the driving wheel 3. Even when the conveyed goods are heavy, the slippage of the conveyer belt on the driving wheel 3 can be prevented since the projections 31 are engaged with the through holes 15e.

As described above, the conveyer belt of the present invention is composed of a large number of ceramic links which are slidably connected to one another, is superior in the wear resistance, heat resistance, and chemicals resistance and has rust proof characteristic and non-expansion and non-contraction property.

And the conveyer belt of the present invention can be easily composed by connecting a large number of links to one another without using any connecting shaft.

By changing the connecting mode of the links variously, various patterns of belt can be obtained.

The conveyer belt of the present invention can be employed with good durability especially in a high temperature atmosphere such as a tunnel furnace in ceramic industry, and suitably employed especially when chemicals are conveyed or the conveyed goods are immersed in chemicals during the conveying process.

The present invention is not limited to the above described embodiments. For example, in stead of alumina, zirconia, silicon nitride, silicon carbide, sialon or old ceramics can be employed as the material of the links.

The shape of each link is also not limited to that shown in the above described embodiments. Any belt structure will do if the fittable axis portion is connected to the fittable groove endlessly.

What is claimed is:

1. An endless conveyor belt comprising:
   a plurality of links each formed of a ceramic sintered body pivotally connected to one another about axes transverse to the running direction of said belt,
   said links comprising a first kind of links and a second kind of links,
   each of said first kind of links being composed of a main body of generally rectangular prism shape having columnar fittable axis portions at the front and rear surfaces thereof connected thereto through supporting portions,
   each of said second kind of links being of generally rectangular prism-shape and provided with fittable grooves of arc-shaped section in the front surface and the rear surface thereof, each of said supporting portions having a thickness smaller than the width of the mouth of said fittable grooves,
   said first kind of links and said second kind of links being alternately arranged in said running direction of said conveyor belt and said fittable axis portions of each of said first kind of links being turnably inserted into said fittable grooves of adjacent links of said second kind of links, whereby each of said fittable axis portions is fitted in each of said fittable grooves so that said first kind of links and said second kind of links are alternately and turnably connected to each other.

2. A conveyer belt according to claim 1, wherein a through hole is formed in the central portion of each of at least some of said first kind of links in the direction of the thickness thereof.

3. A conveyer belt according to claim 1, wherein said plurality of links are made of a material selected from the group consisting of alumina, zirconia, silicon nitride, silicon carbide, silicon.

4. The belt defined in claim 1 wherein the first kind of links are of different length than the second kind of links in the running direction

* * * * *